United States Patent
Ulrich

[11] 3,714,194
[45] Jan. 30, 1973

[54] DI(AZIDOSULFONYL)XANTHONES
[75] Inventor: Henri Ulrich, Northford, Conn.
[73] Assignee: The Upjohn Company, Kalamazoo, Mich.
[22] Filed: June 9, 1971
[21] Appl. No.: 151,525

[52] U.S. Cl.....................260/335, 96/35.1, 96/91 N, 96/115 R
[51] Int. Cl..............................C07d 7/44
[58] Field of Search......................260/335

[56] References Cited

OTHER PUBLICATIONS

Jour. Org. Chem., Vol. 28, April 12, 1963, pp. 902–906.
Beilstein, Vol. XVIII, page 574.
R. T. Morrison et al., "Organic Chemistry" Allyn and Bacon, Inc., Boston, (1960) pp. 507, 515.

Primary Examiner—Norma S. Milestone
Attorney—Denis A. Firth

[57] ABSTRACT

Di(azidosulfonyl)xanthones are described of the formula:

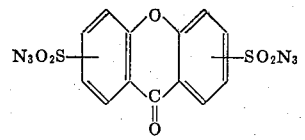

These compounds are prepared by reaction of the corresponding sulfonylhalides with sodium azide. The di-(azidosulfonyl)xanthones are useful as cross-linking agents in photoresist systems, elastomers and the like. The sulfonylazido groups are sensitive to radiation particularly to ultraviolet light. This sensitivity is enhanced by the presence of the carbonyl groups of the xanthone, i.e., the compounds of the above formula have a built-in sensitizer.

2 Claims, No Drawings

DI(AZIDOSULFONYL)XANTHONES

BACKGROUND OF THE INVENTION

1. Field of the Invention

This invention relates to novel sulfonylazides and is more particularly concerned with novel xanthone sulfonazides and with methods for their preparation.

2. Description of the Prior Art

Sulfonazides and methods for their use as cross-linkers are known in the art; see, for example, U.S. Pat. Nos. 3,058,957, 3,203,937, 3,261,786, and 3,562,269. I have now found a novel class of sulfonylazides which contain a built-in sensitizer which greatly facilitates the use of this particular class of compounds as cross-linkers.

SUMMARY OF THE INVENTION

This invention comprises azidosulfonyl xanthones having the formula:

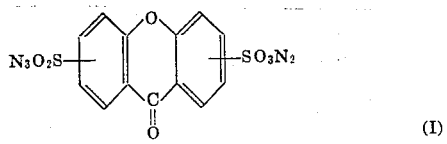

(I)

These compounds are radiation-sensitive cross-linkers for polymers and are useful as such in photoresist systems and the like.

DETAILED DESCRIPTION OF THE INVENTION

The compounds of the formula (I) are prepared conveniently by reacting the corresponding sulfonyl halides of the formula:

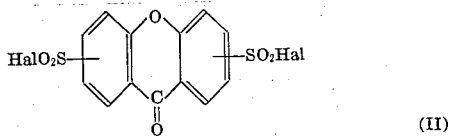

(II)

where Hal represents chlorine or bromine, with sodium azide under conditions generally employed in the art for this reaction; see, for example, U.S. Pat. No. 3,562,269. Illustratively, the sulfonyl halide (II) and the sodium azide are brought together in the presence of a polar solvent such as acetonitrile, N,N-dimethylformamide, hexamethyl-phosphoramide, ethyl acetate, butyl acetate and the like. The reaction generally requires temperatures above room temperature (circa 25°C) in order that the rate of reaction be reasonable. Reaction temperatures from about 50°C to about reflux temperature of the reaction mixture are generally advantageous. The progress of the reaction can be followed conveniently by infrared spectroscopy or by observing the amount of sodium halide which separates. Completion of the desired reaction is usually indicated by the end of further precipitation of sodium halide.

The sulfonyl halide (II) and the sodium azide are advantageously employed in substantially stoichiometric proportions, i.e. 2 moles of sodium azide per mole of sulfonyl halide (II). However, a slight excess of sodium azide is employed where the reaction times are prolonged.

The desired compounds (I) are readily isolated from the reaction product by filtration to remove sodium halide followed by evaporation of the filtrate. The compounds (I) are crystalline solids which can be purified, if desired, by recrystallization from an appropriate solvent.

The sulfonyl halides (II) which are employed as starting materials in the preparation of the compounds (I) of the invention are themselves novel compounds which can, however, be prepared from known starting materials by procedures well recognized in the art. Illustratively, xanthone-2,7-di(sulfonyl chloride) can be prepared readily by direct chlorosulfonation of xanthone in accordance with standard chlorosulfonation procedures as specifically exemplified hereinafter. Alternatively, the appropriate phenolsulfonic acid and sulfo-o-chlorobenzoic acid are condensed under conventional etherification techniques to give the corresponding phenyl ether of salicylic acid having sulfonic acid groups in each benzene nuclei. The phenyl ether is then reacted with thionyl chloride under the conditions set forth by Lock et al., Monatsh 67, 24, 1935, whereby ring closure is effected and, simultaneously, the sulfonic acid groups are converted to the corresponding sulfonyl chloride. Alternatively, the phenyl ether is cyclized using concentrated sulfuric acid using the procedure of Ullmann et al. Berichte, 38, 2120, 1905, and the resulting xanthone sulfonic acid is converted to the acid halide by treatment with phosphorus pentachloride or pentabromide. The various sulfosalicylic acids and phenol sulfonic acids employed as starting materials for the compounds (II) are all well known in the art.

As set forth above, the compounds of the invention of formula (I) are useful as cross-linking agents. Methods of using polyazides and polysulfonazides as cross-linkers have been described in a number of patents, including U.S. Pat. No. 3,058,957 (Breslow), U.S. Pat. No. 3,203,937 (Breslow et al.), and U.S. Pat. No. 3,261,786 (Breslow). Methods of using polysulfonylazides as cross-linkers in photo-resist systems are described in British Patent 1,062,884 (Laridon et al.). In general, the method of using polysulfonylazides as cross-linkers in photoresist systems comprises preparing a solution of a mixture of 0.1 percent to 25 percent by weight of the cross-linker with a linear polymer such as a polyamide, a polyester and/or a polyester amide. The solution is applied to a supportive base. Typical supports are usually metal, paper, glass, ceramic, plastic, polyvinyl acetate film, polystyrene film, polyethylene film and the like. Various additives may also be present in the solution such as dyes, solvents, sensitizers, and radiation absorbers. After drying the applied film, a photographic negative is placed between the film and a source of thermal or ultraviolet radiation. The film is then exposed to thermal or ultraviolet radiation, which action results in cross-linking of the polymer thereby rendering the exposed portion insoluble in a wide range of solvents. The concentration of cross-linker and the length of exposure to thermal or photo radiation is directly proportional to the degree of cross-linking and amount of insoluble polymer obtained at the site of exposure. When washed with a suitable solvent, the unexposed portion of the film dissolves and is flushed away leaving the insoluble cross-linked polymer on the surface of the film support in the form of a positive image corresponding to the negative used in the radiation or heating step. This positive image is resistant to a wide range of solvents, acids, alkalies, water, abrasives, and the like and is therefore suited for use in reproduction processes such as lithography, photomechanical reproduction processes and production of printed microcircuitry.

The compounds of Formula (I) are also capable of cross-linking polymeric dyes and polymer substrates. The polymer substrate need not have functional groups for attachment of the cross-linker, e.g. OH, $HN_2$, COOH, but any polymer substrate having carbon to hydrogen bonds is cross-linked using compounds of Formula (I). Examples of such polymers include polyolefins, polyethers, polyesters, polyamides, and polyurethanes. Furthermore, photo or heat bonding of polymeric films with superior physical properties (abrasion resistance, improved hardness and the like) on to basic polymer substrates can be effected using the compounds of Formula (I) as cross-linking agents.

The compounds of Formula (I) have the advantage over other known sulfonazides in that the molecules of Formula (I) are capable of intramolecular energy transfer, i.e. they can act as their own sensitizers. Thus, the carbonyl group in the compounds of Formula (I) is excited by radiation of wavelength 300–350 nm and such excitation leads to photolysis of the sulfonazide groups with nitrene formation followed by bonding of the nitrene groups to —C — H bonds in neighboring polymer molecules, thus leading to cross-linking. Indeed, the compounds of Formula (I) are so sensitive to exposure to ultraviolet light that it is preferable that they be stored in the absence of light.

The following preparations and examples describe the manner and process of making and using the invention and set forth the best mode contemplated by the inventor of carrying out the invention but are not to be construed as limiting.

PREPARATION 1

Xanthone-2,7-bis(sulfonyl chloride)

A mixture of 232 g (2 moles) of chlorosulfonic acid and 39.2 g (0.2 mole) of xanthone is heated with stirring for 1 hour at 120° to 124°C. The resulting mixture is cooled and poured carefully into crushed ice. The solid which separates is isolated by filtration, washed with water and dried. There is thus obtained 56.65 g (72.2 percent theoretical yield) of xanthone-2,7-bis(sulfonyl chloride) having a melting point of 195° to 210°C. The melting point is raised to 215° to 220°C by dissolution in acetone followed by precipitation in water. The infrared spectrum of the compound (chloroform solution) exhibits maxima at 1671, 1382, and 1175 reciprocal centimeters.

Anal: Calcd for $C_{13}H_6Cl_2O_6S_2$: Cl, 18.05

Found: Cl, 17.80

Preparation 2

Phenol-3-sulfonic acid was reacted with 2-chloro-5-sulfobenzoic acid to give xanthone-2,6-bis(sulfonyl chloride) using the following procedure.

To a mixture of equimolar proportions of 2-chloro-5-sulfobenzoic acid and phenol-3-sulfonic acid in methanol are added one equivalent of sodium and a catalytic amount of copper powder. The mixture is refluxed for several hours, the methanol is then removed and the residue is heated in an airbath at 170° to 190°C for 15 minutes to produce the sodium salt of 3-sulfophenyl ether of 4-sulfosalicylic acid. Addition of approximately 20 times by weight of concentrated $H_2SO_4$ and heating on a steam bath for 20 minutes produces xanthone-2,6-bis-(sulfonic acid) which is treated with two equivalents of $PCl_5$ to produce the disulfonyl chloride.

Similarly, using as starting materials the appropriate phenol sulfonic acid and chlorosulfobenzoic acid, there are obtained xanthone-1,6-bis(sulfonyl chloride), xanthone-3,7-bis(sulfonyl chloride), xanthone-4,7-bis-(sulfonyl chloride), and xanthone-1,5-bis(sulfonyl chloride).

EXAMPLE 1

To a suspension of 15.72 g (0.04 mole) of xanthone-2,7-bis(sulfonyl chloride) in 300 ml of acetonitrile, there is added slowly 10.4 g (0.16 mole) of sodium azide. The resulting mixture is heated under reflux with stirring for 4 hours. The product so obtained is filtered and the precipitate is washed well with water to remove sodium chloride before being dried. There is thus obtained 8.15 g (50 percent theoretical) of xanthone-2,7-bis(sulfonazide) as a crystalline material having a melting point of 175° to 176°C. The infrared spectrum of this material (chloroform solution) exhibited maxima at 2137 and 1671 reciprocal centimeters.

Anal. Calcd for $C_{13}H_6N_6O_6S_2$: C, 38.42; H, 1,48; N, 20.69

Found: C, 38.63; H, 1.83; N, 20.08

Similarly, using the above procedure but replacing xanthone-2,7-bis(sulfonyl chloride) by xanthone-2,6-bis-(sulfonyl chloride), xanthone-3,7-bis(sulfonyl chloride), xanthone-4,7-bis(sulfonyl chloride), and xanthone-1,5-bis(sulfonyl chloride), there are obtained xanthone-2,6-bis(sulfonazide), xanthone-3,7-bis(sulfonazide), xanthone-4,7-bis(sulfonazide), and xanthone-1,5-bis(sulfonazide), respectively.

I claim:

1. Xanthone sulfonazides of the formula:

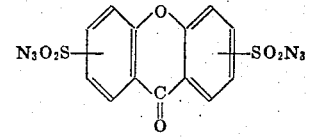

2. Xanthone-2,7-disulfonazide.

* * * * *